(12) United States Patent
Maruyama

(10) Patent No.: US 6,822,804 B2
(45) Date of Patent: Nov. 23, 2004

(54) PROJECTION LENS AND LIQUID CRYSTAL PROJECTOR

(75) Inventor: Sadao Maruyama, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 10/718,656

(22) Filed: Nov. 24, 2003

(65) Prior Publication Data
US 2004/0100702 A1 May 27, 2004

(30) Foreign Application Priority Data

Nov. 27, 2002 (JP) ........................................ 2002-344186

(51) Int. Cl.[7] .............................. G02B 9/00; G02B 9/12
(52) U.S. Cl. ......................... 359/651; 359/649; 359/784
(58) Field of Search ................................. 359/649–651, 359/689–690, 784–792

(56) References Cited

U.S. PATENT DOCUMENTS

| 6,317,269 B1 | * | 11/2001 | Yamamoto | ................... 359/651 |
| 6,445,511 B1 | * | 9/2002 | Kitahara | ..................... 359/748 |
| 6,452,728 B2 | * | 9/2002 | Shikama | ..................... 359/651 |
| 6,560,041 B2 | * | 5/2003 | Ikeda et al. | ................. 359/749 |

FOREIGN PATENT DOCUMENTS

JP         09068650 A    3/1997

* cited by examiner

Primary Examiner—Thong Q Nguyen
(74) Attorney, Agent, or Firm—Jacobson Holman PLLC

(57) ABSTRACT

The present invention is directed to a projection lens that has a sufficiently long back focus to enable a wide-angle projection and has astigmatism, abaxial spherical aberration (coma), distortion, and other types of aberration satisfactorily corrected. The projection lens includes first to third groups of lenses G1, G2 and G3. The first group of lenses G1 consist of four pieces of lenses, and the first or foremost negative one of the lenses is an aspheric lens. The second group of lenses G2 consist of two pieces of lenses, and the first or foremost negative one and the second positive one of the lenses are joined together. The third group of lenses G3 consist of six pieces of lenses, and the second foremost positive one, the third negative one, and the fourth positive one of the lenses are joined together. The projection lens is characterized in that the following formulae are satisfied;

$$bf/f \geq 2.8 \quad (1)$$

$$1.1 \leq f2/f3 \leq 1.6, \text{ and} \quad (2)$$

$$1.65 \leq |f1|/f \leq 2.05, \quad (3)$$

where f1, f2 and f3 are focal lengths unique to the first, the second and the third groups of lenses G1, G2 and G3, respectively, and f and bf are total focal length and back focus of the whole optics, respectively.

2 Claims, 4 Drawing Sheets

T-CHRO

DIST%

PROJECTION LENS AND LIQUID CRYSTAL PROJECTOR

BACKGROUND OF THE INVENTION

1. Field of the Invention

The present invention relates to a projection lens, and more particularly, to a projection lens used for a liquid crystal projector that magnifies and then projects an image produced by liquid crystal valves of liquid crystal display (LCD) elements. The present invention is also related to a liquid crystal projector incorporating the projection lens therein.

2. Prior Art

A liquid crystal projector produces image data of three primary colors, B (blue), G (green) and R (red) on its respective light valves, and then, after letting light fluxes of the image data of the primaries pass through a cross-prism to refract the light fluxes into optically coaxial fluxes, directs them upon a single projection lens to have a projection image on a screen. Since the cross-prism is disposed between the liquid crystal panel and the projection lens, the projection lens of the liquid crystal projector is required to take a long back focus.

To produce a clear image from light beams of G, B and R in color entering and exiting a dichroic mirror, it is desired that the projection lens is strongly telecentric to propagate a principal light beam with merely slight inclination. Also to make a produced image clear, aberration, especially, astigmatism, abaxial spherical aberration (coma), distortion, and the like must be corrected.

When the liquid crystal projector is to serve as a rear projector to cast light from behind the screen, it is additionally desired that the liquid crystal projector is compact and particularly incorporates the projection lens of a short focal length that enables a wide-angle projection.

An exemplary projection lens in the prior art is 47.00 mm in focal length, 154.99 mm in back focus, and 71.48 degrees in angular field and is highly telecentric in a section of reduction (e.g., see, as a whole, Patent Document 1 as identified with Japanese Patent Laid-Open No. H09-68650).

Various features of the projection lens disclosed in the Patent Document 1 are generally unsatisfactory to make up a currently demanded compact liquid crystal projector capable of projecting a clear image, and therefore, a solution to this is a projection lens that especially has a longer back focus enabling a wide-angle projection, with astigmatism, abaxial spherical aberration (coma), distortion aberration and the like being sufficiently corrected.

The present invention is made in view of the aforementioned disadvantages of the prior art projection lens, and accordingly, it is an object of the present invention to provide a projection lens of back focus long enough to enable a wide-angle projection with astigmatism, abaxial spherical aberration (coma), distortion, and the like being sufficiently corrected.

SUMMARY OF THE INVENTION

The present invention provides a projection lens that includes first to third groups of lenses G1, G2 and G3. The first group of lenses G1 consist of four pieces of lenses, and the first or foremost negative one of the lenses is an aspheric lens. The second group of lenses G2 consist of two pieces of lenses, and the first or foremost negative one and the second positive one of the lenses are joined together. The third group of lenses G3 consist of six pieces of lenses, and the second foremost positive one, the third negative one, and the fourth positive one of the lenses are joined together. The projection lens is characterized in that the following formulae are satisfied;

$$bf/f \geq 2.8 \tag{1}$$

$$1.1 \leq f2/f3 \leq 1.6, \text{ and} \tag{2}$$

$$1.65 \leq |f1|/f \leq 2.05, \tag{3}$$

where f1, f2 and f3 are focal lengths unique to the first, second and third groups of lenses G1, G2 and G3, respectively, and f and bf are total focal length and back focus of the whole optics, respectively.

The present invention also provides a liquid crystal projector having three liquid crystal panels for three primary colors in combination with the projection lens.

In the projection lens according to the present invention, a condition of (1) $bf/f \geq 2.8$, leads to a longer back focus that ensures a space occupied by optical elements such as a dichroic mirror (cross-prism) as well as a shorter focal length that enables a wide-angle projection of which short projection distance further enables the projection in a-restricted space. Unless the condition is satisfied, it is impossible to ensure a sufficient back focus.

Another condition of (2) $1.1 \leq f2/f3 \leq 1.6$ guarantees a sufficient back focus with various aberrations being well balanced. Under a condition of $f2/f3 \leq 1.1$, G2 is relatively greater in refractive index than G3, and this causes an insufficient back focus and an unsatisfactorily corrected spherical aberration. This also causes a negative field curvature and a positive distortion. When a condition of $1.6 < f2/f3$ is satisfied, G2 is relatively weaker in refractive index than G3, and this brings about a sufficient back focus but instead causes a positive field curvature.

Another condition of (3) $1.65 \leq |f1|/f \leq 2.05$ ensures a sufficient back focus and also guarantees satisfactory corrections of abaxial spherical aberration and astigmatism as well as a smaller aperture of the first group of lenses G1. A condition of $|f1|/f < 1.65$ is advantageous in ensuring a sufficient back focus but has adverse effects of a greater refractive index of G1 and a greater positive field curvature, especially, a positive transit of a sagittal image surface. Under a condition of $2.05 < |f1|/f$, the aperture of the lens group G1 should be greater to space the lens groups G1 and G2 farther from each other for a longer back focus.

The first or foremost one of the four pieces of lenses in the first group G1 has its surface shaped negatively aspheric to reduce distortion.

The first or foremost negative one and the next one of the two pieces of lenses in the second group G2 are joined together to successfully correct chromatic aberration.

The second foremost positive one, the third negative one, and the fourth positive one of the six pieces of lenses in the third group G3 are jointed together to successfully correct magnification aberration.

BEST MODE OF THE INVENTION

Figure 1:
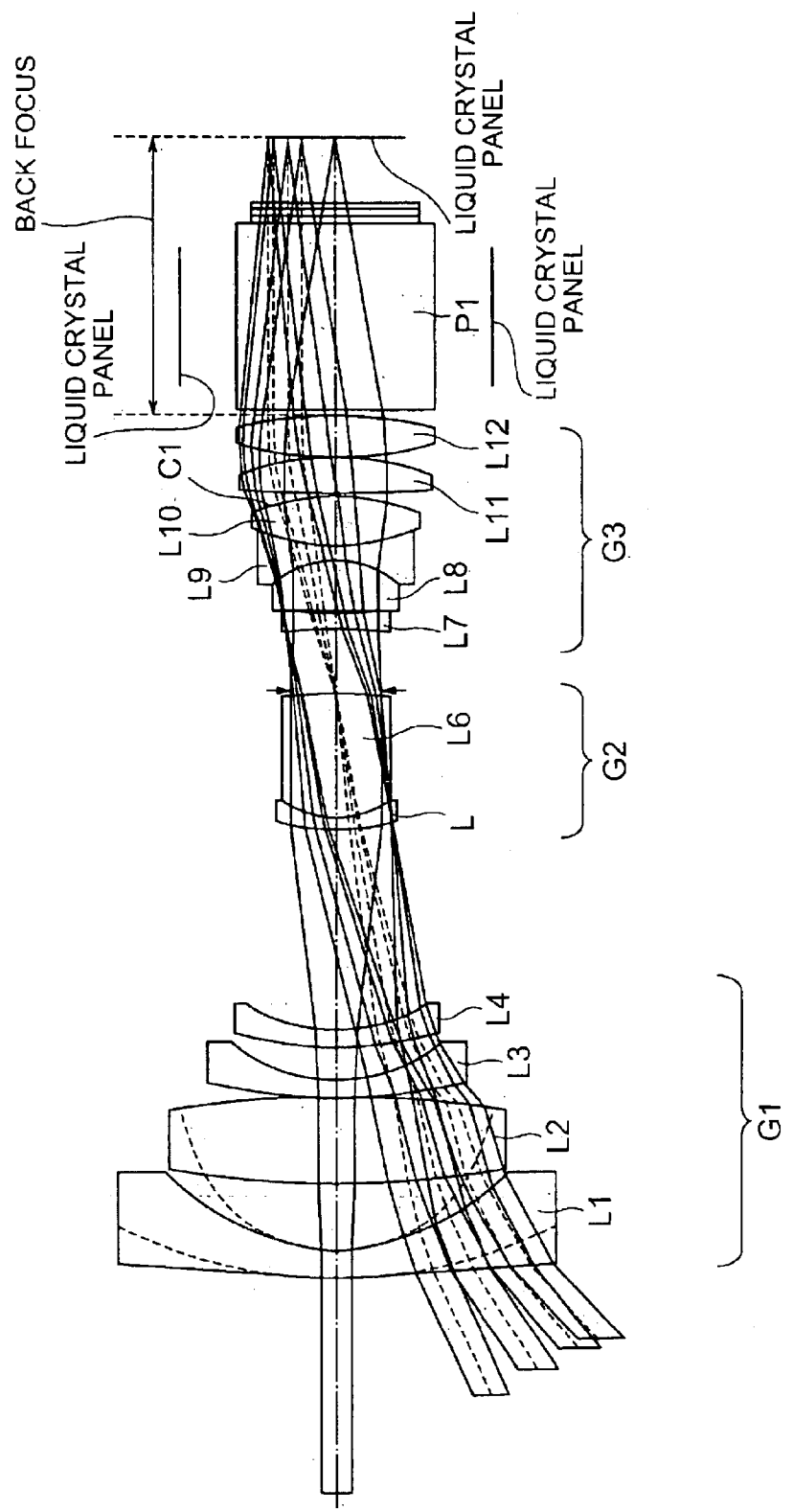
FIG. 1 depicts an embodiment of a projection lens according to the present invention, together with its optics and optical functions.

A preferred embodiment of a projection lens according to the present invention will be described in conjunction with optical data and the accompanying drawings. The projection lens is, as shown in FIG. 1, 11.406 mm in focal length, 2.30 in F-number, 52.502 in projection magnification (horizontal magnification), 69.0 mm in effective aperture of the first or foremost lens, 31.5 mm in effective aperture of the last or rearmost lens, and 183.181 mm in a distance from a foremost surface of the lenses to an image plane. In FIG. 1, spherical planes of the first and second foremost surfaces having respective paraxial curvature radii are depicted in broken line. Optical data of the projection data are described as follows. C1 in a column for lens numbers designates a composite aspheric surface while P1 denotes a cross-prism.

| Number of Surface | Curvature | Space | Lens Number | Refractive Index | Dispersion |
|---|---|---|---|---|---|
|  |  |  |  | 1.0 |  |
| 1 Aspheric | 105.1199 | 4.0 | L1 | 1.52669 | 56.20 |
| 2 Aspheric | 24.8454 | 11.13 |  | 1.0 |  |
| 3 | 196.0 | 13.58 | L2 | 1.51023 | 40.93 |
| 4 | −174.0 | 0.2 |  | 1.0 |  |
| 5 | 85.8 | 3.0 | L3 | 1.64223 | 60.09 |
| 6 | 26.8 | 5.39 |  | 1.0 |  |
| 7 | 65.4 | 2.5 | L4 | 1.69948 | 55.33 |
| 8 | 27.2 | 32.51 |  | 1.0 |  |
| 9 | 38.0 | 2.0 | L5 | 1.74400 | 52.65 |
| 10 | 15.0 | 19.99 | L6 | 1.65762 | 39.70 |
| 11 | −71.95 | 0.1 |  | 1.0 |  |
| 12 Aperture | ∞ | 10.01 |  | 1.0 |  |
| 13 | −188.0 | 2.52 | L7 | 1.62261 | 60.28 |
| 14 | 68.25 | 0.63 |  | 1.0 |  |
| 15 | −3700.0 | 8.19 | L8 | 1.48898 | 70.21 |
| 16 | −15.4 | 2.02 | L9 | 1.62367 | 36.26 |
| 17 | 31.62 | 8.01 | L10 | 1.49830 | 81.61 |
| 18 | −33.3 | 0.2 | C1 | 1.53887 | 41.20 |
| 19 Aspheric | −32.8683 | 0.38 |  | 1.0 |  |
| 20 | 201.0 | 5.62 | L11 | 1.48898 | 70.21 |
| 21 | −43.82 | 0.29 |  | 1.0 |  |
| 22 | 63.89 | 6.71 | L12 | 1.49830 | 81.61 |
| 23 | −63.89 | 0.75 |  | 1.0 |  |
| 24 | ∞ | 30.0 | P1 | 1.51805 | 64.15 |
| 25 | ∞ | 1.2 |  | 1.46000 | 62.00 |
| 26 | ∞ | 1.1 |  | 1.52000 | 62.00 |
| 27 | ∞ | 0.25 |  | 1.49000 | 62.00 |
| 28 | ∞ | 0.7 |  | 1.73000 | 62.00 |
| 29 | ∞ |  |  | 1.0 |  |

Formulae expressing aspheric planes of the first, second, and the nineteenth foremost lens surfaces are as follows:

$$X(H) = (H^2/R)/\{1+[1-\epsilon \cdot (H^2/R^2)]^{1/2}\} + A_4 H^4 + A_6 H^6 + A_8 H^8 + A_{10} H^{10}$$

where H is a height perpendicular to the optical axis, X(H) is a displacement along the optical axis at the height H relative to the origin of an apex of each surface, R is a paraxial curvature radius, $\epsilon$ is a constant of a cone, and An is a coefficient of each aspheric surface of the n-th degree. The coefficients of the aspheric surfaces are listed below:

| Number of Surface | Constant of Cone | Coefficient of 4th Degree | Coefficient of 6th Degree |
|---|---|---|---|
| 1 | −99.0000 | −1.86198E−06 | 3.40638E−09 |
| 2 | .5502 | −1.59010E−05 | 1.33663E−08 |
| 19 | .5408 | 8.56503E−08 | 5.36726E−09 |

| Number of Surface | Coefficient of 8th Degree | Coefficient of 10th Degree |
|---|---|---|
| 1 | −2.52108E−12 | 6.08903E−16 |
| 2 | −1.05787E−11 | −1.51678E−15 |
| 19 | −2.32488E−11 | 2.32204E−14 |

Figure 2:
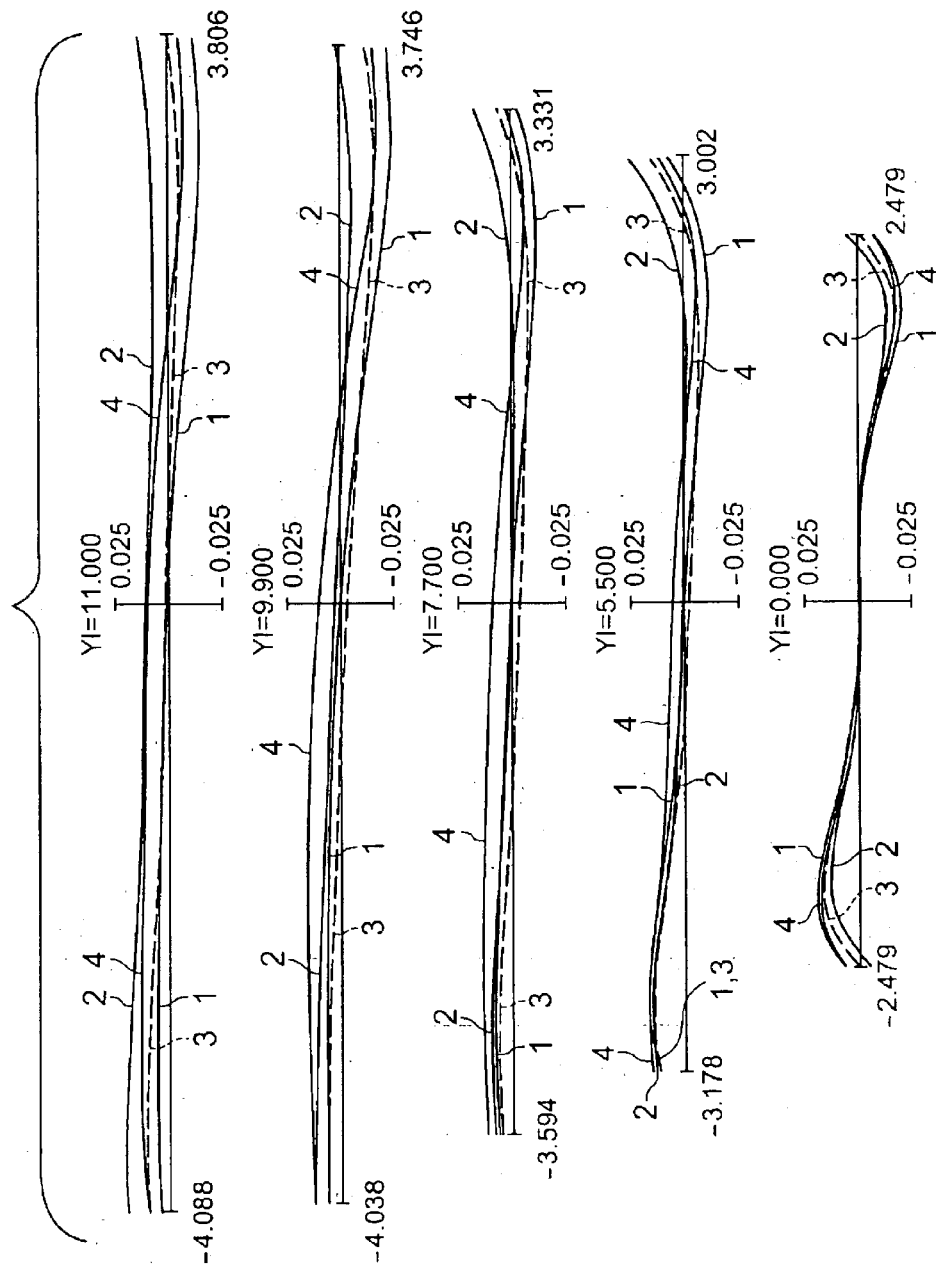
FIG. 2 illustrates graphs of comatic aberration of the projection lens.
Figure 3:
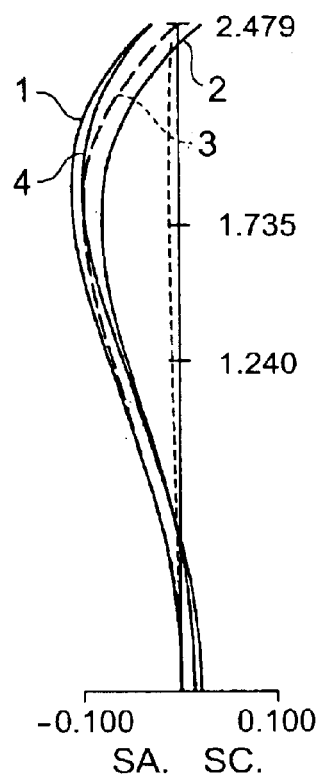
FIG. 3 illustrates graphs of spherical aberration of the projection lens in relation with sine conditions.
Figure 4:
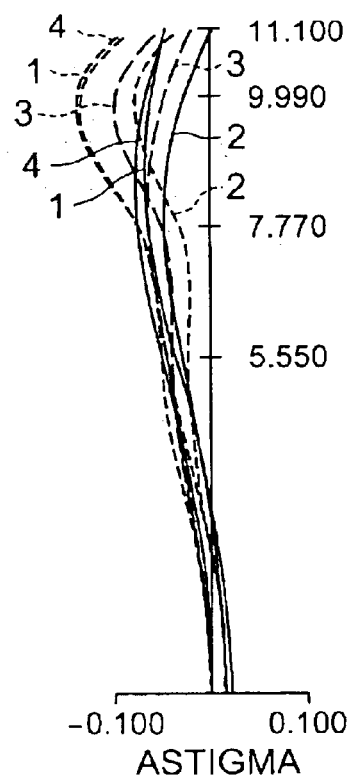
FIG. 4 illustrates graphs of astigmatism of the projection lens.
Figure 5:
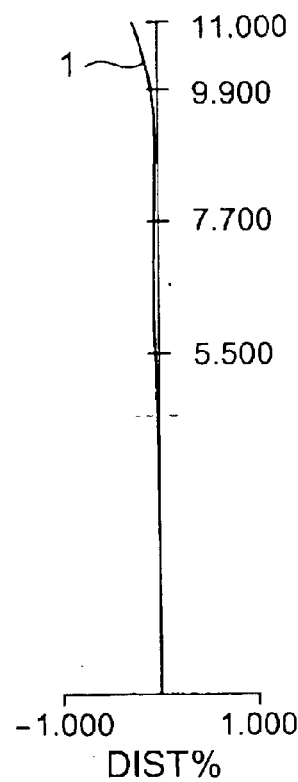
FIG. 5 illustrates graphs of transverse chromatic aberration of the projection lens.
Figure 6:
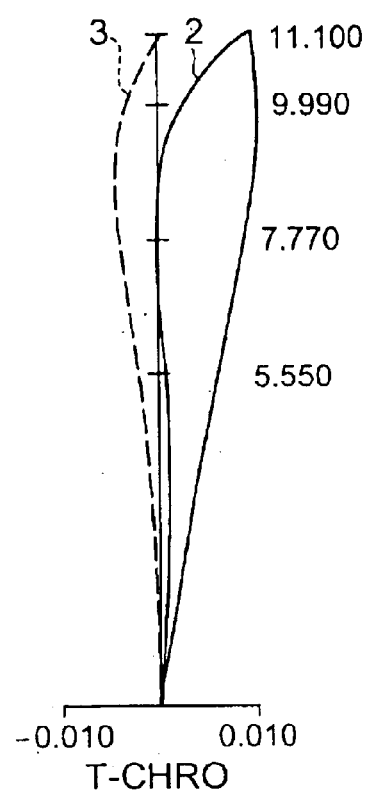
FIG. 6 illustrates graphs of distortion of the projection lens.

Various aberrations of the exemplary projection lens of the present invention are depicted in the drawings. FIG. 2 illustrates comatic aberration. FIG. 3 shows spherical aberration (SA) in terms of sine conditions (SC). FIG. 4 shows astigmatism. FIG. 5 depicts transverse chromatic aberration. FIG. 6 shows distortion. In FIGS. 2 to 6 respectively showing different types of the aberration, graph 1 to graph 4 represent the aberration at various levels of wavelength, 550 nm (G), 435 nm (G), 460 nm (B), and 620 nm (R) in order.

In accordance with the present invention, the projection lens has a back focus sufficiently long to enable a wide-angle projection and has astigmatism, abaxial spherical aberration (coma), distortion, and other types of aberration satisfactorily corrected.

What is claimed is:

1. A projection lens including first to third groups of lenses G1, G2 and G3, the first group of lenses G1 consisting of four pieces of lenses the first or foremost negative one of which is an aspheric lens, the second group of lenses G2 consisting of two pieces of lenses the first or foremost negative one and the second positive one of which are joined together, the third group of lenses G3 consisting of six pieces of lenses the second foremost positive one, the third negative one, and the fourth positive one of which are joined together, the projection lens is the following formulae;

$$bf/f \geq 2.8, \quad (1)$$

$$1.1 \leq f2/f3 \leq 1.6, \text{ and} \quad (2)$$

$$1.65 \leq |f1|/f \leq 2.05, \quad (3)$$

where f1, f2 and f3 are focal lengths unique to the first, second and third groups of lenses G1, G2 and G3, respectively, and f and bf are total focal length and back focus of the whole optics, respectively.

2. A liquid crystal projector having three liquid crystal panels for three primary colors in combination with the projection lens according to claim 1.

* * * * *